United States Patent [19]

Ono et al.

[11] Patent Number: 4,966,442
[45] Date of Patent: Oct. 30, 1990

[54] ELECTRO-OPTICAL DEVICE AND METHOD FOR MANUFACTURING SAME

[75] Inventors: Yoichi Ono, Suwa; Kunio Fujii, Ohgaki; Shoji Hinata; Satoshi Wakabayashi, both of Suwa, all of Japan

[73] Assignee: Seiko Epson Corporation, Tokyo, Japan

[21] Appl. No.: 305,892

[22] Filed: Feb. 2, 1989

[30] Foreign Application Priority Data

Feb. 2, 1988 [JP] Japan .............................. 63-12869[U]
Feb. 4, 1988 [JP] Japan .................................. 63-24395

[51] Int. Cl.⁵ ............................................. G02F 1/133
[52] U.S. Cl. .................................. 350/339 R; 350/344
[58] Field of Search .................. 350/339 R, 341, 343, 350/344

[56] References Cited

U.S. PATENT DOCUMENTS

| | | | |
|---|---|---|---|
| 3,994,568 | 11/1976 | King et al. | 350/343 |
| 4,347,304 | 8/1982 | Sakurai et al. | 430/291 |
| 4,362,771 | 12/1982 | Umeda et al. | 350/343 X |
| 4,390,245 | 6/1983 | Shimizu et al. | 350/343 |
| 4,597,635 | 7/1986 | Hoshikawa | 350/339 R X |
| 4,640,583 | 2/1987 | Hoshikawa et al. | 350/339 R X |
| 4,709,991 | 12/1987 | Hoshikawa | 350/339 R |
| 4,740,060 | 4/1988 | Komura et al. | 350/344 |
| 4,802,742 | 2/1989 | Ichikawa et al. | 350/339 R |

FOREIGN PATENT DOCUMENTS

| | | | |
|---|---|---|---|
| 0142316 | 8/1983 | Japan | 350/344 |
| 60-006982 | 6/1985 | Japan . | |
| 60-153025 | 8/1985 | Japan . | |
| 61-015128 | 1/1986 | Japan . | |
| 61-020928 | 1/1986 | Japan . | |
| 61-041122 | 2/1986 | Japan . | |
| 61-080122 | 4/1986 | Japan . | |
| 63-071829 | 4/1988 | Japan . | |

Primary Examiner—Stanley D. Miller
Assistant Examiner—Anita Pellman Gross
Attorney, Agent, or Firm—Blum Kaplan

[57] ABSTRACT

An electro-optical device including a pair of flexible substrates including transparent electrodes deposited on a phenoxy resin layer and separated by spacers is provided. The flexible substrates include a support substrate, a gas barrier layer laminated on each side of the support substrate and a phenoxy resin layer on the interior gas barrier layer. Spacers are embedded in an orientation film to maintain distance between the substrates. Improved bonding strength between substrates is provided by a sealing region free of orientation film.

12 Claims, 2 Drawing Sheets

FIG. 1
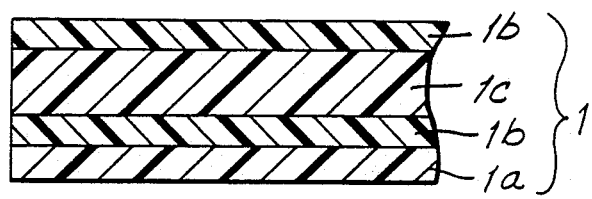
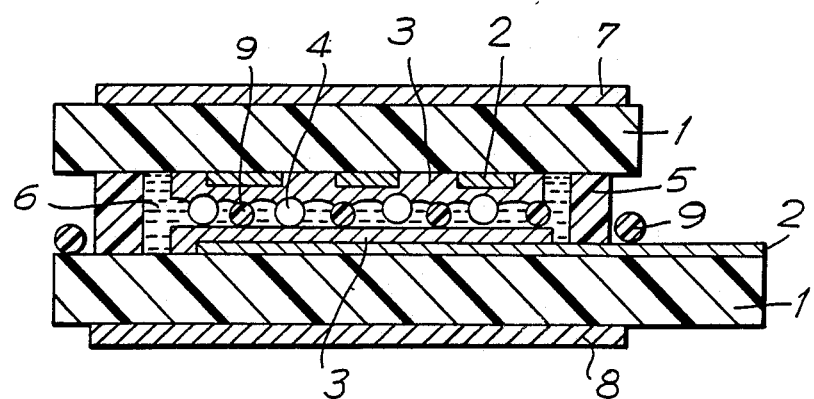
FIG. 2

ELECTRO-OPTICAL DEVICE AND METHOD FOR MANUFACTURING SAME

BACKGROUND OF THE INVENTION

This invention relates generally to an electro-optical device and more particularly to an electro-optical device in which a liquid crystal is sandwiched between flexible substrates including gas barrier layers and separated by spacers.

A prior art electro-optical device including a flexible substrate is described in Japanese Patent Laid-Open Application No. 60-6982. Polyvinylidene chloride which acts a gas barrier layer is laminated on a phenoxy resin substrate at the surface opposite to the liquid crystal layer to form a flexible substrate. The gas barrier layer improves the display, however, the device is not fully adequate. As a result, gas enters the liquid crystal material through the substrate and bubbles cause defects in the display. Additionally, part of the polyvinylidene chloride resin dissolves and chlorine gas is discharged. This results in an increase in the current value of the liquid crystal display device and lower reliability. Additionally, the resin becomes discolored leading to a poor quality display.

Japanese Patent Laid-Open Application No. 60-153025 shows a prior art electro-optical device having spacers fixed to the aligning or orientation film on a flexible substrate. The aligning treated film is provided in the region where the upper and lower substrate are sealed together. Since the adhesion between the substrate film and the orientation film is weak, a poor bond between the opposed substrates occurs which can cause the substrate to puncture due to pressure. Additionally, when the aligning treated film is not formed in the region where the sealing compound is placed, there are no spacers so that the upper substrate contacts the lower substrate in that region. This results in incomplete sealing and wide variation in cell thickness. It has been suggested to eliminate the space between the aligning film and the sealing compound, however, this is not practical in terms of positional accuracy.

Furthermore, depending upon the hardness of the aligning film on which the spacers are fixed, there is a wide variation in the amount the spacers sink into the substrate surface. Thus, cell thickness is not fully uniform.

Accordingly, it is desireable to provide an electro-optical device which does not permit gas bubbles to permeate the liquid crystal layer through the flexible substrate, which does not suffer from irregular color caused by variation in thickness when the substrate is bent or twisted.

SUMMARY OF THE INVENTION

Generally speaking, in accordance with the invention, an improved electro-optical device including a pair of flexible resin substrates including at least one polymeric resin gas barrier layer laminated on each surface separated by spacers is provided. A phenoxy resin layer is laminated on at least one of the outermost gas barrier layers. A transparent electrode is formed on the phenoxy resin layer and an aligning treated film is formed on the electrode layer. Fixed spacers and movable spacers are positioned on the aligning film to prevent the upper and lower flexible substrates from contacting each other.

Accordingly, it is an object of the invention to provide an improved electro-optical device.

Another object of the invention is to provide an improved electro-optical device including a flexible substrate formed of at least one polymeric resin gas barrier layer laminated on each side of a polymeric resin support substrate and a phenoxy resin layer laminated on one of the gas barrier layers.

A further object of the invention is to provide an improved electro-optical device wherein transparent electrodes are deposited on a phenoxy resin layer on a gas barrier layer.

Still another object is to provide an improved electro-optical device with spacers which are embedded in an orientation layer formed on flexible substrates.

Still a further object of the invention is to provide an improved electro-optical device wherein the electrodes do not break due to the stress caused by bending or twisting the substrates or thermal shock.

Still a further object of the invention is to provide an improved electro-optical device having greater reliability.

Still other objects and advantage of the invention will in part be obvious and will in part be apparent from the specification.

The invention accordingly comprises the several steps and the relation of one or more of such steps with respect to each of the others, and the article possessing the features, properties and relation of elements which are exemplified in the following detailed disclosure, and the scope of the invention will be indicated in the claims.

BRIEF DESCRIPTION OF THE DRAWINGS

For a better understanding of the invention, reference is had to the following description taken in connection with the accompanying drawings, in which:

FIG. 1 is a sectional view of a film substrate laminate for a liquid crystal display device in accordance with the invention;

FIG. 2 is a sectional view of a liquid crystal display device constructed in accordance with the invention;

DESCRIPTION OF THE PREFERRED EMBODIMENTS

Figure 3:
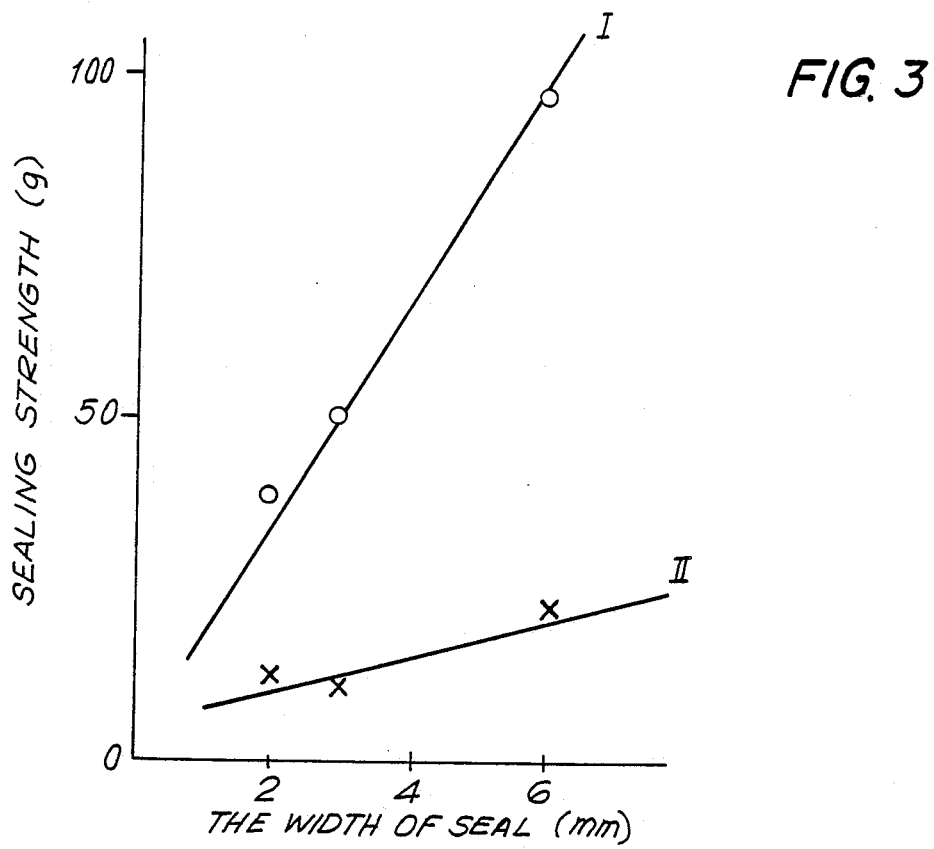
FIG. 3 is a graph illustrating the relationship between seal width and sealing strength for the devices of FIG. 2.

FIG. 1 is a cross-sectional view of a portion of a flexible substrate 1 used to form a liquid crystal display device 20 in accordance with the invention. A gas barrier layer 1b is formed on each side of a flexible synthetic resin support substrate 1c. A phenoxy resin layer 1a is formed on one gas barrier layer 1b.

Liquid crystal display device 20 includes a pair of opposed transparent substrates 1. A transparent electrode layer 2 is formed on phenoxy resin layer 1a of each flexible substrate 1. A liquid crystal orientation film 3 is formed on transparent electrode layer 2 and is rubbed to provide an aligning direction for liquid crystal material 6. A plurality of fixed spacers 4 and a plurality of movable spacers 9 are sprayed onto orientation film 3 of at least on flexible substrate 1.

Flexible substrates 1 with transparent electrodes 2 facing each other are joined together by a sealer 5 in a region not containing orientation film 3. Liquid crystal material 6 is injected between flexible substrates 1. A first polarizer 7 is positioned on upper substrate 1 and a polarizer 8 is positioned on lower substrate 1.

The invention will be better understood with reference to the following examples. The examples are presented for purposes of illustration only and are not intended to be construed in a limiting sense.

EXAMPLE 1

Gas barrier layer of ethylenevinyl alcohol copolymer film (EVA film) 1-b having a thickness of 5 μm was laminated on both the sides of support substrate of a polycarbonate resin film having a thickness of 75 μm. A plenoxy resin film (GF film) having a thickness of 15 μm was laminated on one side of the EVA laminated films to form a composite film. In this Example, each resin is coated on the previous resin. An indium oxide-tin oxide transparent conductive film, having a thickness of about 500 Å was formed on phenoxy resin film 1a of composite substrate 1 to a total thickness of 100 μm by a low-temperature sputtering method. Thereafter, predetermined electrode pattern 2 was formed by photolithography. Orientation film 3 was deposited on electrodes 2 by offset printing except in the region where the electrodes are connected to the external driving circuit and in the region of sealing compound. Prior to evaporation of the solvent in printed orientation film 3, spacers 4 formed of resin balls having a diameter of 10 μm were sprayed onto orientation film 3 by a wet-type spray with the solution in which spacers 4 are mixed was sprayed by an air spray, and heated for 3 hours at 130° C., thereby fixing the spacers onto the aligning film 3. The density of fixed spacers 4 was about 120 per mm².

The aligning treatment was completed by rubbing orientation film 3 in a predetermined direction with a grinding cloth. In this Example, fixed spacers 4 were not removed by the aligning treatment. Additionally, in the display panel region outside orientation film 3, spacers 4 were scattered by air of the wet-type spray and, as a result, the spacers were not present there.

An epoxy sealing compound 5 adhesive having a thickness of 30 μm was printed by a screen printing process printing on one substrate and a conductive agent, i.e. silver paste, was printed by screen process printing on the other substrate. Movable spacers 9 which are resin balls having a diameter of 10 μm were sprayed by wet-type spray onto orientation film 3 and substrates 1 were joined together. The density of the spacers 9 was about 80 per mm².

After substrates 1 are joined by sealer 5 liquid crystal material 6 was injected into the cell by a vacuum injection method and the injection region was sealed by epoxy adhesive. Polarizers 7 and 8 were placed on upper and lower substrates 1 of liquid crystal cell 20 completing the assembly.

When a liquid crystal display element prepared in the above manner was bent or locally pressed repeatedly at one spot, the liquid crystal display did not exhibit defects resulting from discoloration or air bubbles. Additionally, the sealing strength was not reduced and bleeding of sealing compound did not occur at the terminal portions of the liquid crystal cell, since the spacers were not fixed.

FIG. 3 shows the relationship between sealing strength and the width of the seal. In this Example, there was no orientation film 3 in the region of the sealing compound 5 on substrate 1. In the Comparative Example an orientation film was present on the substrate in the region of the sealing compound. In FIG. 3, straight line I represents the case where the orientation film is not formed in the region of the sealing compound (such as in Example 1), and straight line II represents the case where the orientation film is present between the sealing compound and the substrate. It is clear from FIG. 3 that the sealing strength is several times greater when there is no aligning treated film in the region of the sealing compound. The gas barrier properties of a composite film in accordance with the invention were tested by measuring the transmittance of oxygen gas. The transmittance of oxygen gas of an untreated polycarbonate film (PC simplex film) was also tested. Table 1 shows the results of the test. It is clear from Table 1 that a composite film in accordance with the invention provides superior gas barrier properties compared to a PC simplex film.

TABLE 1

| Transmittance Of Oxygen Gas [cc/(m².atm.24Hr)] | |
| --- | --- |
| Example 1 | 0.5 to 1.0 |
| Example 2 | 0.5 to 1.5 |
| Comparative Example (PC simplex film) | 30 to 50 |

Ambient Condition: Temperature 25° C., Humidity 60% RH

EXAMPLE 2

A liquid crystal display device including a composite substrate was prepared in the same manner as in Example 1 with the following modifications. A 10 μm thick gas barrier of polyvinyl alcohol film (PVA film) was laminated on both sides of a 50 μm thick support substrate of a polycarbonate film. A 15 μm thick phenoxy film was laminated on one side of the laminated film. Thus, an 85 μm thick composite film was obtained. A transparent electrode was formed on the phenoxy layer of the composite film. The reliability of this Example was as good as that of Example 1.

Additionally, the gas barrier properties of the substrate film were improved compared with the PC simplex film shown in Table 1 and the effects obtained were as good as in Example 1.

EXAMPLE 3

A liquid crystal display device including a composite substrate was prepared in the same manner as in Example 1 with the following modifications. A 5 μm thick EVA gas barrier layer was laminated on one side of a 75 μm thick polycarbonate support substrate. A 5 μm thick PVA film was laminated on the other side of the PC film and a 15 μm thick phenoxy film was laminated on the EVA film. Thus, a 100 μm thick composite film was obtained. A transparent electrode was formed on the composite film on the phenoxy side. The same effects were obtained as in Example 1.

EXAMPLE 4

A liquid crystal display device including a composite substrate was prepared in the same manner as in Example 1 with the following modification. A 5 μm thick gas barrier layer formed of an EVA film was laminated on one side of a 75 μm support substrate formed of a PC film. A 5 μm thick PVA film was laminated on the other side of the PC film. A 15 μm thick phenoxy film was laminated on the PVA film. Thus a 100 μm thick composite film was obtained. The composite film was used as a substrate and a transparent electrode was formed thereon. The same results were obtained as in Example 1.

EXAMPLE 5

A liquid crystal display device including a composite substrate was prepared in the same manner as in Example 1 with the following modification. A 5 μm thick gas barrier formed of an EVA film was laminated on both sides of a 75 μm thick support substrate formed of a PC film. A 15 μm thick phenoxy film was laminated on both sides of the resulting film. Thus a 115 μm thick composite film was obtained. A transparent electrode was formed on one phenoxy film.

EXAMPLE 6

A liquid crystal display device including a composite substrate was prepared in the same manner as in Example 1 with the following modification. A 10 μm thick gas barrier layer formed of an PVA film was laminated on both sides of a 100 μm thick support substrate formed of PC film. A 10 μm thick phenoxy film was laminated on both sides of the resulting film. Thus a 140 μm thick composite film was obtained. A transparent electrode was formed on one phenoxy film.

EXAMPLE 7

A liquid crystal display device including a composite substrate was prepared in the same manner as in Example 1 with the following modification. A 5 μm thick gas barrier layer formed of an EVA film was laminated on one side of a 75 μm thick support substrate formed of a PC film. A 5 μm thick PVA film was laminated on the other side of the PC film. A 15 μm thick phenoxy film was laminated on both sides of the resulting film. Thus, a 115 μm thick composite film was obtained. The composite film was used as a substrate, and a transparent electrode was formed on the phenoxy film on the EVA film side.

EXAMPLE 8

A liquid crystal display device including a composite substrate was prepared in the same manner as in Example 1 with the following modification. A 5 μm thick gas barrier layer formed of an EVA film was laminated on one side of a support substrate formed of a 75 μm thick PC film. A 5 μm thick PVA film was laminated on the other side of the PC film. A 15 μm thick phenoxy film was laminated on both sides of the laminated film. Thus a 115 μm thick composite film was obtained. The composite film was used as a substrate and a transparent electrode was formed on the phenoxy film on the side of the PVA film.

EXAMPLE 9

A liquid crystal display device including a composite substrate was prepared in the same manner as in Example 1 with the following modification. A 5 μm thick gas barrier layer formed of an EVA film was laminated on both sides of a 75 μm thick support substrate formed of a polyarylate resin film (UP film). In addition, a 15 μm phenoxy film was laminated on one of the laminated layers 6. Transparent electrode was formed on the composite film on the phenoxy film.

EXAMPLE 10

A liquid crystal display device including a composite substrate was prepared in the same manner as in Example 1 with the following modification. A 15 μm thick gas barrier layer formed of a PVA film was laminated on both sides of a support substrate of a 50 μm thick polyarylate film. A 15 μm thick phenoxy film was laminated on one side of the laminated film and a 95 μm thick composite film was obtained. A transparent electrode was formed on the composite film on the phenoxy film.

EXAMPLE 11

A liquid crystal display device including a composite substrate was prepared in the same manner as in Example 1 with the following modification. A 10 μm thick gas barrier layer formed of an EVA film was laminated on one side of a support substrate formed of a 75 μm thick polyarylate film. A 10 μm thick PVA film was laminated on the other side of the polyarylate film. A 5 μm thick phenoxy film was laminated on the support substrate on the side of the EVA film. Thus a 100 μm thick composite film was obtained. A transparent electrode was formed on the composite film.

EXAMPLE 12

A liquid crystal display device including a composite substrate was prepared in the same manner as in Example 1 with the following modification. A 5 μm thick gas barrier layer formed of an EVA film was laminated on one side of a 75 μm thick support substrate formed of a polyarylate film. A 5 μm thick PVA film was laminated on the other side of the polyarylate film. 15 μm thick phenoxy film was laminated on the resulting film on the side of the PVA film. Thus, 100 μm thick composite film was obtained. A transparent electrode was formed on the composite film on the side of the phenoxy film.

EXAMPLE 13

A liquid crystal display device including a composite substrate was prepared in the same manner as in Example 1 with the following modification. A 5 μm thick gas barrier layer formed of an EVA film was laminated on both sides of a support substrate formed of a 75 μm thick polyarylate film. A 15 μm thick phenoxy film was laminated on both sides of the resulting film. Thus a 115 μm thick composite film was obtained. A transparent electrode was formed thereon at one phenoxy film side.

EXAMPLE 14

A liquid crystal display device including a composite was prepared in the same manner as in Example 1 with the following modification. A 10 μm thick gas barrier layer formed of a PVA film was laminated on both sides of a 50 μm thick support substrate formed of a polyarylate film. Further, a 15 μm thick phenoxy film was laminated on both sides of the resulting film. Thus a 115 μm thick composite film was obtained. A transparent electrode was formed on the phenoxy film side.

EXAMPLE 15

A liquid crystal display device including a composite substrate was prepared in the same manner as in Example 1 with the following modification. A gas barrier layer formed of an EVA film having a thickness of 5 μm was laminated on one side of a support substrate of a polyarylate film having a thickness of 75 μm. A PVA film having a thickness of 5 μm was laminated on the other side of the polyarylate film. Further, a phenoxy film having a thickness of 15 μm was laminated on both sides of the laminated film and a 115 μm thick composite film was obtained. The composite film was used as a substrate and a transparent electrode was formed on the phenoxy film on the EVA film side.

EXAMPLE 16

A liquid crystal display device was prepared in the same manner as in Example 1 with the following modification. A 5 μm thick gas barrier layer formed of an EVA film was laminated on one side of a 75 μm thick support substrate formed of a polyarylate film. A 5 μm thick PVA film was laminated on the other side of the polyarylate film. A 15 μm thick phenoxy film was laminated on both sides of the laminated film. Thus, a 15 μm thick composite film was obtained. The composite film was used as a substrate and a transparent electrode was formed on the phenoxy film on the side of the PVA film.

EXAMPLE 17

A liquid crystal display device was prepared in the same manner as in Example 1 with the following modification. A 5 μm thick gas barrier layer formed of an EVA film was laminated on both sides of a 75 μm thick support substrate formed of a polyethersulfone resin film (PES). A 15 μm thick phenoxy film was laminated on one side of the laminated film. Thus, a 100 μm thick composite film was obtained. The composite film was used as a substrate. A transparent electrode was formed on the composite film substrate on the phenoxy film side. The properties obtained in this example were as good as those in Example 1 with regard to manufacturing and reliability.

EXAMPLE 18

A liquid crystal display device including a composite substrate was prepared in the same manner as in Example 1 with the following modification. A 5 μm thick gas barrier layer formed of a PVA film was laminated on both sides of a support substrate formed of a 100 μm thick polyethersulfone film. A 5 μm thick phenoxy film was laminated on one side of the laminated layer and a 115 μm thick composite film was obtained. A transparent electrode was formed on the composite film on the phenoxy film side.

EXAMPLE 19

A liquid crystal display device including a composite substrate was prepared in the same manner as in Example 1 with the following modification. A 5 μm thick gas barrier layer formed of an EVA film was laminated on one side of a support substrate formed of a 75 μm thick polyethersulfone film. A 5 μm thick gas barrier layer formed of a PVA film was laminated on the other side of the polyethersulfone film. A 15 μm thick phenoxy film was laminated on the EVA film. Thus a 100 μm thick composite film was obtained. A transparent electrode was formed on the composite film on the phenoxy film side.

EXAMPLE 20

A liquid crystal display including a composite substrate was prepared in the same manner as in Example 1 with the following modification. A 5 μm gas barrier layer formed of an EVA film was laminated on one side of a 75 μm thick support substrate formed of a polyethersulfone film. A 5 μm thick gas barrier formed of a PVA film was laminated on the other side of the support substrate. A 15 μm thick film was laminated on the PVA film. Thus, a 100 μm thick composite film was formed. A transparent electrode was formed on the composite film on the phenoxy film side.

EXAMPLE 21

A liquid crystal display device including a composite substrate was prepared in the same manner as in Example 1 with the following modification. A 5 μm thick gas barrier formed of an EVA film was laminated on both sides of a 75 μm thick support substrate formed of a polyethersulfone film. A 15 μm thick phenoxy film was laminated on both sides of the EVA film. Thus a 115 μm thick composite film was obtained. A transparent electrode was formed on the composite film.

EXAMPLE 22

A liquid crystal display device including a composite substrate was prepared in the same manner as in Example 1 with the following modification. A 10 μm thick gas barrier layer formed of a PVA film was laminated on both sides of a 50 μm thick support substrate formed of a polyethersulfone film. A 10 μm thick phenoxy film was laminated on both sides of the resulting film. Thus a 90 μm thick composite film was obtained. A transparent electrode was formed on the phenoxy film.

EXAMPLE 23

A liquid crystal display device including a composite substrate was prepared in the same manner as in Example 1 with the following modification. A 15 μm thick gas barrier layer formed of an EVA film was laminated on one side of a 100 μm support substrate formed of a polyethersulfone film. A 15 μm thick gas barrier layer formed of a PVA film was laminated on the other side of the polyethersulfone film. A 10 μm thick phenoxy film was laminated on both sides of the laminated film. Thus a 140 μm thick composite film was obtained and used as a substrate. A transparent electrode was formed on the phenoxy film on the EVA film side.

EXAMPLE 24

A liquid crystal display device including a composite substrate was prepared in the same manner as in Example 1 with the following modification. A 5 μm thick gas barrier layer formed of an EVA film was laminated on one side of a 75 μm thick support substrate formed of a polyethersulfone film. A 5 μm thick gas barrier layer formed of a PVA film was laminated on the other side of the polyethersulfone film. A 15 μm thick phenoxy film was laminated on both sides of the laminated film. Thus a 115 μm thick composite film was obtained and used as a substrate. A transparent electrode was formed on the phenoxy film on the side having the PVA film.

EXAMPLE 25

A liquid crystal display device including a composite substrate was prepared in the same manner as in Example 1 with the following modification. A 10 μm gas barrier layer formed of an EVA film was laminated on one side of a 75 μm thick support substrate formed of a polyarylate film. A 15 μm thick phenoxy film was laminated on the other side of the polyarylate film. Thus a 100 μm thick composite film was obtained. A transparent electrode was formed on the composite film on the side of the phenoxy film.

EXAMPLE 26

A liquid crystal display device including a composite substrate was prepared in the same manner as in Example 1 with the following modification. A 10 μm thick gas barrier formed of an EVA film was laminated on one side of a 75 μm thick support substrate formed of a polyarylate film. A 15 μm thick gas barrier layer formed of a phenoxy film was laminated on the other side of the polyarylate film. A 10 μm thick epoxy resin film (EP film) which increases the durability of the EVA film and acts as a gas barrier layer was laminated on the EVA film. Thus a 110 μm thick composite film was obtained. A transparent electrode was formed on the composite film on the phenoxy film side.

EXAMPLE 27

A liquid crystal display device including a composite substrate was prepared in the in Example 1 with the following modification. A 10 μm thick gas barrier layer formed of an EVA film was laminated on one side of a 75 μm thick support substrate formed of a polyarylate film. A 10 μm thick epoxy resin film was laminated on the EVA film. A 15 μm thick phenoxy film was laminated on the other side of the EVA film. Thus a 110 μm thick composite film was obtained. A transparent electrode was formed on the phenoxy film.

EXAMPLE 28

A liquid crystal display device including a composite substrate was prepared in the same manner as in Example 1 with the following modification. A 40 μm thick phenoxy film was laminated on both sides of a 20 μm thick gas barrier layer formed of an EVA film. Thus a 100 μm thick composite film was obtained. The manufacturability and the reliability was as good as that of Example 1.

EXAMPLE 29

A liquid crystal display device including a composite substrate was prepared in the same manner as in Example 1 with the following modification. A 75 μm thick polyethersulfone film was laminated on one side of a gas barrier layer formed of a 10 μm thick EVA film. A 15 μm thick phenoxy film was laminated on the other side of the EVA film. Thus a 100 μm thick composite film was obtained and used as a substrate.

In the above mentioned examples, various combinations of gas barrier layers and support substrates are shown. The gas barrier properties improve proportionally with an increase in the thickness of the gas barrier layer. However, when the thickness of the gas barrier layer is increased with respect to a single surface only, the composite film tends to be warped due to asymmetrical properties. Therefore, it is desirable to laminate gas barrier layers on both sides of the support substrate. In addition, since the total thickness is limited, it is necessary to balance the thickness of the support substrate and the gas barrier layer. It is desirable that the film thickness of the support substrate is between about 50 and 200 μm, and the film thickness of the gas barrier layer is between about 1 and 50 μm.

EXAMPLE 30

A liquid crystal display device including a composite substrate was prepared in the same manner as in Example 1 with the following modification. In this example, a glass fiber with a diameter of 10 μm and a length of 50 μm was used as a spacer and fixed onto the aligning treated film in the same manner as the resin balls. Resin balls with a diameter of 10 μm were dispersed onto the aligning treated film as spacers which were not fixed.

No difficulties were encountered by using a resin ball as a fixed spacer and a glass fiber as a spacer which is not fixed.

EXAMPLE 31

A liquid crystal display device including a composite substrate was prepared in the same manner as in Example 1 with the following modification. In this example, the density of resin balls which were fixed to aligning treated film was 30 per mm$^2$ and the density of resin balls which were not fixed to the aligning treated film was 20 per mm$^2$.

EXAMPLE 32

A liquid crystal display device including a composite substrate was prepared in the same manner as in Example 1 with the following modification. In this example, the density of resin balls which were fixed to aligning treated film was 200 per mm$^2$ and the density of resin balls which were not fixed was 20 per mm$^2$.

EXAMPLE 33

A liquid crystal display device including a composite substrate was prepared in the same manner as in Example 1 with the following modification. In this example, the density of resin balls which were fixed to aligning treated film was 200 per mm$^2$ and the density of resin balls which were not fixed to the aligning treated film was 120 per mm$^2$.

EXAMPLE 34

A liquid crystal display device including a composite substrate was prepared in the same manner as in Example 1 with the following modification. In this example, the density of resin balls which were fixed to aligning treated film 3 was 300 per mm$^2$ and the density of resin balls which were not fixed to the aligning treated film 3 was 160 per mm$^2$.

EXAMPLE 35

Figure 4:
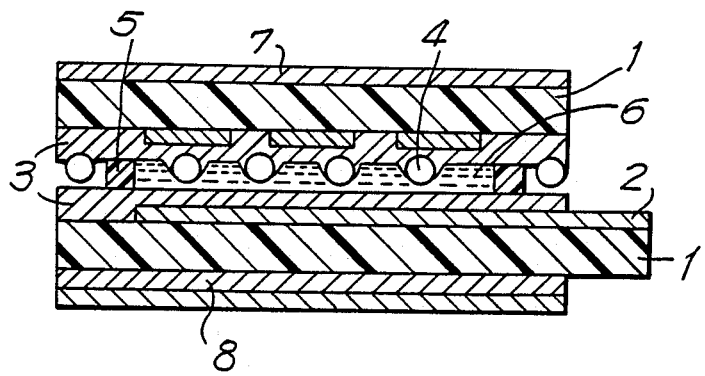
FIG. 4 is a sectional view of a liquid crystal display device in accordance with a second embodiment of the invention.

FIG. 4 shows an alternate embodiment in which orientation film 3 was offset printed over the entire surface of substrate 1 except a terminal portion 2a of electrode 2 contacting the external driving circuit. Before the solvent in the orientation film 3 is evaporated, resin balls 4 having a diameter of 10 μm were dispersed thereon and baked.

| No. | The list of Examples 1 to 29 Formation | Thickness |
|---|---|---|
| 1 | EVA/PC/EVA/GF | 100 μm |
| 2 | PVA/PC/PVA/GF | 85 |
| 3 | PVA/PC/EVA/GF | 100 |
| 4 | EVA/PC/PVA/GF | 100 |
| 5 | GF/EVA/PC/EVA/GF | 115 |
| 6 | GF/PVA/PC/PVA/GF | 140 |
| 7 | GF/PVA/PC/EVA/GF (ITO) | 115 |
| 8 | GF/EVA/PC/PVA/GF (ITO) | 115 |

-continued

The list of Examples 1 to 29

| No. | Formation | Thickness |
|---|---|---|
| 9 | EVA/UP/EVA/GF | 100 |
| 10 | PVA/UP/PVA/GF | 95 |
| 11 | PVA/UP/EVA/GF | 100 |
| 12 | EVA/UP/PVA/GF | 100 |
| 13 | GF/EVA/UP/EVA/GF | 115 |
| 14 | GF/PVA/UP/PVA/GF | 100 |
| 15 | GF/PVA/UP/EVA/GF | 115 |
| 16 | GF/EVA/UP/PVA/GF | 115 |
| 17 | EVA/PES/EVA/GF | 100 |
| 18 | PVA/PES/PVA/GF | 115 |
| 19 | PVA/PES/EVA/GF | 100 |
| 20 | EVA/PES/PVA/GF | 100 |
| 21 | GF/EVA/PES/EVA/GF | 115 |
| 22 | GF/PVA/PES/PVA/GF | 90 |
| 23 | GF/PVA/PES/EVA/GF | 140 |
| 24 | GF/EVA/PES/PVA/GF | 115 |
| 25 | EVA/UP/GF | 100 |
| 26 | EP/EVA/UP/GF | 110 |
| 27 | EP/UP/EVA/GF | 110 |
| 28 | GF/EVA/GF | 100 |
| 29 | PES/EVA/GF | 100 |

Figure 5:
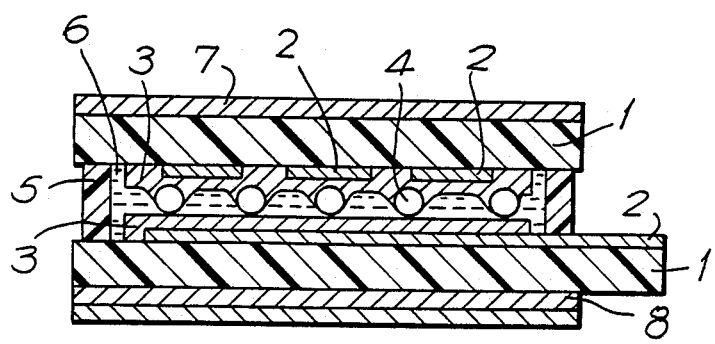
FIG. 5 is a sectional view of a liquid crystal display device in accordance with a third embodiment of the invention.

Sealing compound 5 was provided on orientation film 3. However, it is desirable that orientation film 3 not be formed in the seal forming region, as in Example 1, in order to increase sealing strength as shown in Example 5. In the embodiment of FIG. 5, the display device includes fixed spacers 4 only, but no fixers which were not spacers.

In each example, a film may be formed on a film of a different resin by either a laminating method or a coating method. Additionally, in each example, when a phenoxy film is formed on both surfaces of a composite film, the phenoxy film on the surface without the electrode can be replaced with a film of an acrylic resin, polyester resin or the like.

There are also other methods for fixing spacers to an orientation film:

(1) A solution in which spacers are dispersed can be sprayed with air onto a flexible substrate on which an electrode pattern has been formed. The orientation film is formed by offset printing followed by baking.

(2) The aligning compound in which spacers has been already mixed can be printed followed by baking.

The spacers may be fixed to one or both of the substrates. Inorganic or organic materials may be used for the spacers which preferably are spherical or cylindrical. It is also desirable that the number of spacers which are fixed is greater than the number of spacers which are not fixed, since the cell thickness changes with the movement of the spacers.

The ability of the spacers to maintain a gap between the substrates is dependent on the density of the spacers. The greater the density of spacers is, the greater the ability to hold a gap between substrates. However, if the density of spacers is too great, the aligning treatment tends to produce defects. The best results are obtained when the combined total density of the spacers which are fixed and the spacers which are not fixed is between about 50 and 500 per $mm^2$.

In the Examples described above, the electro-optical device is a liquid crystal cell. The invention can be applied to an optical electric element which functions as an optical shutter, including a liquid crystal panel for an electric sun glass. Thus, the invention is not limited to only a liquid crystal display device.

In summary, the invention includes a flexible substrate of a polymeric resin film having at least one gas barrier layer and a phenoxy resin surface on which a transparent electrode is formed. An aligning treatment film is formed on the flexible substrate and fixed spacers and spacers which are not fixed are placed on the orientation film. This eliminates con&.act between the upper and lower substrates when the display is curved which causes poor quality display. Thus, the construction results in a reliable liquid crystal display device which does not exhibit discoloration or air bubbles if it is bent or pressed. Additionally, a stable coupling portion is provided. Further, during manufacture spacers which are not fixed to the terminal electrode portion are removed by a washing process. Therefore, a stable coupling portion is provided.

It will thus be seen that the objects set forth above, among those made apparent from the preceding description, are efficiently attained and, since certain changes may be made in the above construction without departing from the spirit and scope of the invention it is intended that all matter contained in the above description or shown in the accompanying drawings shall be interpreted as illustrative and not in a limiting sense.

It is also to be understood that the following claims ar intended to cover all of the generic and specific features of the invention herein described and all statements of the scope of the invention which, as a matter of language, might be said to fall therebetween.

What is claimed is:

1. An electro-optical device, comprising:
a pair of opposed and spaced apart flexible substrates with a liquid crystal material therebetween;
each substrate being a composite substrate including a resin substrate base and having a phenoxy resin layer on the interior surface thereof,
a transparent electrode selectively deposited on the phenoxy resin layer for cooperating with the electrode on the opposed substrate for providing the electro-optical effect;
a transparent orientation film disposed across the electrodes on the interior surface of each substrate;
a plurality of non-conductive spacers fixed to the orientation film on one substrate; and
a plurality of non-conductive spacers disposed on the surface of the orientation film, the density of the non-conductive spacers between about 50 and 500/$mm^2$.

2. The electro-optical device of claim 1, wherein the composite substrate includes a gas barrier layer of a polymer resin disposed on at least one surface of at least one substrate.

3. The electro-optical device of claim 1, wherein the composite substrate includes a gas barrier layer of a polymeric resin disposed on both surfaces of the substrate base with the phenoxy resin on the gas barrier layer on the inside of the substrate.

4. The electro-optical device of claim 1, further including a sealer disposed about the periphery of the substrates for joining the opposed substrates together, the peripheral region of the substrate wherein the sealer attached to the substrate being free of orientation film.

5. The electro-optical device of claim 1, wherein the substrate base is a polymeric material selected from the group consisting of polycarbonate resin, polyarylate resin and polyethersulfone resin.

6. The electro-optical device of claim 2, wherein the gas barrier layer is selected from the group consisting of ethylenevinyl alcohol polymer and polyvinyl alcohol.

7. The electro-optical device of claim 1, wherein the density of spacers fixed to the orientation film exceed the density of spacers disposed on the surface of the orientation film.

8. The electro-optical device of claim 2, wherein the composite substrate has a thickness between about 50 and 200 μm.

9. The electro-optical device of claim 8, wherein the thickness of each gas barrier layer is between about 1 and 50 μm.

10. An electro-optical device, comprising:
 a pair of opposed and spaced apart flexible substrates with a liquid crystal material therebetween;
 the substrates formed of a gas barrier layer of a resin with a phenoxy layer disposed on each surface thereof;
 a transparent electrode selectively disposed on the phenoxy resin layer opposed to the other substrate for cooperating to provide the electro-optical effect;
 a transparent orientation film disposed across the electrodes on each substrate;
 a plurality of non-conductive spacers fixed to the orientation film on one substrate; and
 a plurality of non-conductive spacers disposed on the surface of the orientation film, the density of the non-conductive spacers between about 50 and 500/mm$^2$.

11. A process for preparing an electro-optical device, comprising:
 providing a pair of flexible substrate bases;
 depositing a phenoxy resin layer on one surface of the substrate bases;
 selectively depositing transparent electrodes on the phenoxy resin layers;
 disposing an orientation film on the electrode surfaces of the substrate bases;
 fixing non-conductive spacers on at least one orientation film;
 disposing non-conductive spacers on the surface of the orientation film, the total density of the spacers between about 50 and 500/mm$^2$;
 depositing a sealer about the periphery of the substrates; and
 joining the substrates together at the sealer.

12. The process of claim 11, further including the step of depositing a gas barrier layer directly on at least one surface of the substrate base.

* * * * *